(12) United States Patent
Yoo

(10) Patent No.: US 11,440,143 B2
(45) Date of Patent: Sep. 13, 2022

(54) FLUX COMPOSITION FOR BRAZING ALUMINUM AND METHOD FOR BRAZING ALUMINUM USING THE SAME

(71) Applicants: Hyundai Motor Company, Seoul (KR); Kia Motors Corporation, Seoul (KR)

(72) Inventor: Chang Yeol Yoo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 761 days.

(21) Appl. No.: 16/204,555

(22) Filed: Nov. 29, 2018

(65) Prior Publication Data

US 2020/0114476 A1 Apr. 16, 2020

(30) Foreign Application Priority Data

Oct. 10, 2018 (KR) .......................... 10-2018-0120687

(51) Int. Cl.
- *B23K 35/362* (2006.01)
- *B23K 35/36* (2006.01)
- *B23K 103/10* (2006.01)

(52) U.S. Cl.
CPC ........ *B23K 35/362* (2013.01); *B23K 35/3602* (2013.01); *B23K 2103/10* (2018.08)

(58) Field of Classification Search
CPC .................................................. B23K 35/361
See application file for complete search history.

(56) References Cited

U.S. PATENT DOCUMENTS

| | | | |
|---|---|---|---|
| 10,300,563 B2 | 5/2019 | Itoh et al. | |
| 10,562,122 B2 | 2/2020 | Seseke-Koyro et al. | |
| 2003/0098338 A1 | 5/2003 | Dockus et al. | |
| 2011/0220617 A1* | 9/2011 | Becker ................ | B23K 1/0012 219/85.2 |
| 2012/0318488 A1 | 12/2012 | Hyogo et al. | |
| 2014/0345750 A1 | 11/2014 | Steiner et al. | |

FOREIGN PATENT DOCUMENTS

| | | | |
|---|---|---|---|
| CN | 1615204 A | | 5/2005 |
| CN | 102884393 A | | 1/2013 |
| CN | 103987483 A | | 8/2014 |
| CN | 104722872 A | | 6/2015 |
| CN | 104961357 A | * | 10/2015 |
| CN | 106232288 A | | 12/2016 |
| CN | 106794556 A | | 5/2017 |
| JP | 2014-531321 A | | 11/2014 |

OTHER PUBLICATIONS

Espacenet machine translation of CN-104961357-A retrieved on Apr. 10, 2021 (Year: 2015).*

* cited by examiner

*Primary Examiner* — Jophy S. Koshy
*Assistant Examiner* — Joshua S Carpenter
(74) *Attorney, Agent, or Firm* — Fox Rothschild LLP

(57) ABSTRACT

Disclosed are a composition for brazing aluminum, and a method for brazing aluminum using the same. The composition for brazing aluminum may have excellent adhesion or bonding strength and improved corrosion resistance, for example, after bonding. The composition for brazing aluminum may include an amount of about 30 to 60 parts by weight of a zinc-based compound, and an amount of about 10 to 40 parts by weight of a metal titanium. For example, by using the composition for brazing aluminum in, base metals may be bonded by applying and heat treating the flux without addition of separate filler metal, thereby simplifying a bonding process and reducing a bonding time.

12 Claims, 2 Drawing Sheets

FLUX COMPOSITION FOR BRAZING ALUMINUM AND METHOD FOR BRAZING ALUMINUM USING THE SAME

CROSS-REFERENCE TO RELATED APPLICATION

This application claims the benefit of priority to Korean Patent Application No. 10-2018-0120687, filed in the Korean Intellectual Property Office on Oct. 10, 2018, the entire contents of which are incorporated herein by reference.

TECHNICAL FIELD

The present invention relates to a composition for brazing aluminum, or a "flux composition", and to a method for brazing aluminum using the same. The composition for brazing aluminum may have improved adhesion and corrosion resistance.

BACKGROUND

In the related arts, brazing has been used for bonding two base metals by applying heat to a filler metal without damaging the base metal at a temperature equal to, or less than a melting point of the base metal to be bonded at a high temperature. For example, brazing is a method for bonding two base metals using a filler metal having a liquid temperature of 450° C. or greater, and applying heat equal to, or less than a solidus temperature of the base metal.

In brazing, when a certain temperature (i.e. brazing temperature) is reached, the brazing filler metal melts and seeps into between the two base metals, and then is brazed. Thus, when the filler metal has a reduced wettability with the base metal to be brazed, a bonding ability deteriorates. In addition, when a bonding gap is large, the filler metal is not fully filled between the two base metals, resulting in an incomplete bond.

In order to reduce the damage of the base metal to be bonded, a metal having a lower melting point than the base metal is used as the filler metal, and for example, Ag-based, Cu/Brass-based, Al-based, CuP-based, Ni-based, Au-based, and Pd-based filler metals have been typically used.

For example, air conditioners such as a radiator, a condenser, a heater, an evaporator, an oil cooler or an inter cooler mounted on a vehicle has been mainly made of aluminum because of its property. On a surface of the aluminum material, an oxide film may be formed, which may cause deterioration of adhesion in brazing. Thus, before putting the above-like filler metal and brazing, the surface of the aluminum material is cleaned using a flux for brazing. Conventional flux composition for brazing includes zinc oxide (ZnO), and titanium oxide ($TiO_2$). These zinc oxide and titanium oxide do not have a direct bonding ability, but are components for improving a corrosion resistance of the base metal.

A conventional method for brazing has been applied the flux containing the zinc oxide and the titanium oxide to an extruded tube material, and heat treated the flux by mixing the filler metal. However, the zinc oxide and the titanium oxide are diffused, and react with the filler metal, or mixed with the filler metal to diffuse non-uniformly over the base metal such that the deterioration may occur.

Therefore, it is necessary to develop a new composition for brazing having excellent adhesion between the base metals by improving the problem of non-uniform diffusion of corrosion resistance strengthening component while showing excellent corrosion resistance.

SUMMARY

In preferred aspects, provided are a novel composition for brazing with excellent corrosion resistance and adhesion, for example, adhesion after heat treatment, without mixing a filler metal after applying the flux composition.

The technical problems to be solved by the present inventive concept are not limited to the aforementioned problems, and any other technical problems not mentioned herein will be clearly understood from the following description by those skilled in the art to which the present invention pertains.

In an aspect of the present invention, provided is a composition (or "flux composition") for brazing aluminum. The composition may include an amount of about 30 to 60 parts by weight of a zinc-based compound, and an amount of about 10 to 40 parts by weight of a metal titanium (Ti).

The "zinc-based compound" as used herein refers to a compound including zinc atom which may form one or more covalent bonds with nonmetallic components (e.g., oxygen, carbon, nitrogen, sulfur, phosphorus, halogen, anions or the like) and/or metallic components (e.g., As, Cr, Mo, Mn, Sb or the like) Exemplary zinc-based compound may include oxides, halides, sulfides, nitrides, phosphides, salts, or complexes thereof.

The zinc-based compound may suitably include one or more selected from the group consisting of zinc oxide (ZnO), zinc oxide ($Zn_2O$), and zinc carbonate ($ZnCO_3$).

The "metal titanium" as used herein refers to a titanium material including elemental titanium as major component, for example, greater than about 95 wt %, about 96 wt %, about 97 wt %, about 98 wt %, about 99 wt %, or about 99.5 wt % of the total weight of the material.

The composition may further include an amount of about 10 to 40 parts by weight of a fluorinated aluminate represented by following Chemical Formula 1:

$$K_xAl_yF_z,$$ [Chemical formula 1]

wherein in the Chemical formula 1, x is in a range of 1 to 6, y is in a range of 1 to 6, z is in a range of 1 to 6, and x+y:z is in a range of about 1:0.1 to 1:3.

The term "fluorinated aluminate" as used herein refers to an aluminum anion comprising aluminum atom and one or more fluorides which are bonded or coordinated to the aluminum ion. Preferably, the fluorinated aluminate may include one or more selected from the group consisting of KAlF, $KAlF_4$, and $K_3AlF_6$.

The composition may be substantially free of a filler metal. The composition may not include the filler metal. Alternatively, the composition may include the filler metal less than or equal to 5 wt % based on the total weight of the dried composition.

The filler metal may suitably include one or more selected from the group consisting of an Ag-based filler metal, a Cu/Brass-based filler metal, an Al-based filler metal, a CuP-based filler metal, a Ni-based filler metal, an Au-based filler metal, and a Pd-based filler metal. The filler metal may include one or more selected from the group consisting of Si, Cu, Zn, Mg, Sn, Bi, Pb, Ag, Ni, and La. A particle size of the filler metal may be in a range of about 10 to 200 μm.

In an exemplary embodiment, the composition may suitably include an amount of about 30 to 60 parts by weight of the zinc-based compound; an amount of about 10 to 40 parts by weight of the metal titanium (Ti); and an amount of about 10 to 40 parts by weight of a fluorinated aluminate. The composition may be substantially free of one or more metal selected from the group consisting of Si, Cu, Zn, Mg, Sn, Bi, Pb, Ag, Ni, and La.

Further provided is the composition that may comprise essentially of, essentially comprise of, or consist of the components of the composition. For example, the composition may comprise essentially of, or essentially comprise of: an amount of about 30 to 60 parts by weight of the zinc-based compound; an amount of about 10 to 40 parts by weight of the metal titanium (Ti); and an amount of about 10 to 40 parts by weight of a fluorinated aluminate.

The composition may consist of an amount of about 30 to 60 parts by weight of the zinc-based compound; an amount of about 10 to 40 parts by weight of the metal titanium (Ti); and an amount of about 10 to 40 parts by weight of a fluorinated aluminate.

In another aspect, provided is a method for brazing an aluminum. The method may include applying the composition as described herein on a subject, and heat treating the composition. The heat treating may be performed at a temperature of about 350 to 600° C.

Further provided is an aluminum article that may include one or more parts. Preferably, a connection part between the one or more parts include the composition as described herein. For instance, the aluminum article may be a radiator, a condenser, a heater, an evaporator, an oil cooler or an inter cooler of a vehicle that has one or more connection parts as described herein.

Further provided is a vehicle including an aluminum part as described herein that has one or more of the described connection parts.

Other aspects of the invention are disclosed infra.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
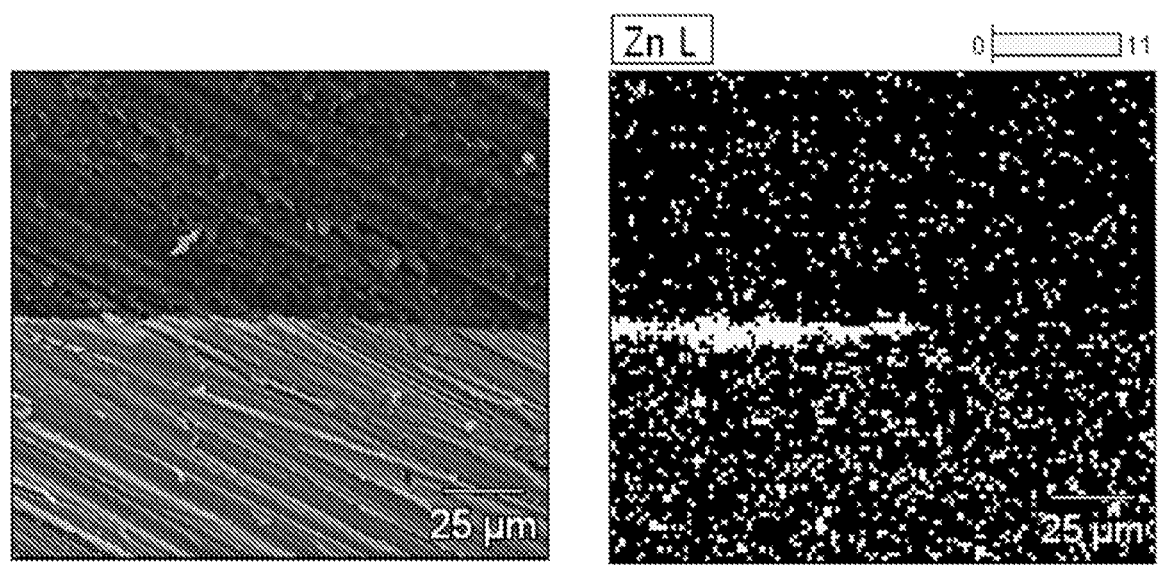
FIG. 1 shows a cross section of an aluminum base metal using an electron microscopy (SEM) after applying a conventional flux composition containing zinc oxide and titanium oxide to the aluminum base metal, then mixing a filler metal with the flux composition, and performing heat treatment at a temperature of 400° C. for 10 minutes, thereby to braze the aluminum base metal.

Hereinafter, the present invention will be described in detail.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In an aspect, a composition for brazing aluminum may include an amount of about 30 to 60 parts by weight of a zinc-based compound, and an amount of about 10 to 40 parts by weight of a metal titanium (Ti).

The composition for brazing aluminum may suitably include zinc-based compounds that may exhibit bonding property. For example, the zinc-based compound may be melted during a heat treatment as enhancing a corrosion resistance of the aluminum material.

The zinc-based compound may suitably include one or more selected from the group consisting of zinc oxide (ZnO), zinc oxide ($Zn_2O$), and zinc carbonate ($ZnCO_3$). The zinc-based compound may preferably include zinc oxide. For example, zinc oxide may be suitably involved in substitution reaction with the metal titanium during the heat treatment after application of the composition.

A content of the zinc-based compound is not limited to the following, but may be, for example, in a suitably range of about 25 to 65 wt %, for example, about 30 to 60 wt %, about 35 to 55 wt %, or about 40 to 50 wt % based on the total weight of the composition. When the content of the zinc-based compound is within the above range, bonding power and corrosion resistance may be substantially improved. When the content of the zinc-based compound is less than the predetermined content range, for example, less than about 25 wt %, the bonding power may decrease due to insufficient Zn content in the composition. Further, when the content of the zinc-based compound is greater than the predetermined content range, a bonding strength may decrease due to a large amount of zinc-based compound unreacted with the metal titanium.

Preferably, the flux composition for brazing aluminum may include an amount of about 45 wt % zinc-based compound based on the total weight of the composition.

The flux composition for brazing aluminum may include the metal titanium. The metal titanium as used herein may be involved in the substitution reaction together with the zinc-based compound during the heat treatment after application of the flux composition.

As used herein, the term "substitution reaction" results in a formation of metal zinc and titanium oxide during the heat treatment after application of the flux composition containing the zinc-based compound, and the metal titanium onto the base metal. In particular, the substitution reaction may be performed at a temperature at which the resulting metal zinc may be melted without damaging the base metal, for example, at a temperature of about 350 to 600° C., about 380 to 550° C., or about 390 to 500° C.

The substitution reaction may be expressed by a following reaction formula 1. However, the specific substitution reaction depends on a type of a zinc compound to be used. The substitution reaction is not limited to the following:

$2Zn_2O+4Ti+3O_2 \rightarrow 4Zn+4TiO_2$ (reaction temperature: 400° C.) [Reaction formula 1]

The metal titanium may be a displacing agent used for displacing the zinc-based compound with the metal zinc, which may exhibit the bonding property during melting. The titanium oxide produced via the substitution reaction, for example titanium dioxide may not have a brittleness. Therefore, when the titanium dioxide is used, bonding strength may be substantially improved.

When a metal Si is contained in place of the metal Ti as the metal for substitution reacting with the zinc-based compound, after application of the composition, and during the heat treatment, a reaction as shown in a following reaction formula 2 may occur. A brittleness of $SiO_2$ produced at this time may result in poor bonding strength during brazing.

$2Zn_2O+4Si+O_2 \rightarrow 4Zn+4SiO_2$ (reaction temperature: 400° C.) [Reaction formula 2]

The metal titanium may be contained in an amount of about 10 to 40 parts by weight based on about 30 to 60 parts by weight of the zinc-based compound. For example, the metal titanium may be contained in an amount of about 10 to 40 parts by weight, for example, about 15 to 35 parts by weight, or about 20 to 30 parts by weight, based on about 40 to 50 parts by weight of the zinc-based compound. When the content of the metal titanium is in the predetermined content range, corrosion resistance may be substantially improved while showing excellent bonding property via the substitution reaction with the zinc-based compound. When the content of the metal titanium is less than the content range, for example, less than about 10 parts by weight, an amount of the zinc-based compound that is not displaced with the metal zinc may increase, thus the bonding strength may decrease. In addition, when the content of the metal titanium is greater than the predetermined content range, for example, greater than about 40 parts by weight, metal titanium that is not displaced may inhibit a uniform diffusion of the molten zinc.

The flux composition for brazing aluminum may further contain fluorinated aluminate to improve a diffusion capacity of the component, and to improve an ability to remove an aluminum oxide film. The fluorinated aluminate may be represented as the following chemical formula (1).

$K_xAl_yF_z$ [Chemical formula 2]

In the chemical formula 1, x is in a range of 1 to 6, y is in a range of 1 to 6, z is in a range of 1 to 6, and x+y:z is a range of about 1:0.1 to 1:3.

The fluorinated aluminate may suitably include one or more selected from a group consisting of $KAlF$, $KAlF_4$, and $K_3AlF_6$. Preferably, the fluorinated aluminate may include $KAlF_4$ for improving the diffusion capacity of the component. However, the present invention is not limited thereto.

The fluorinated aluminate may be included in an amount of about 10 to 40 parts by weight based on about 30 to 60 parts by weight of the zinc-based compound. The fluorinated aluminate may be suitably included in an amount of about 10 to 40 parts by weight, for example about 15 to 35 parts by weight, and about 20 to 30 parts by weight, based on about 40 to 50 parts by weight of the zinc-based compound. Further, the fluorinated aluminate may be contained with the metal titanium in a ratio of about 1:4 to 4:1, for example, about 1:3 to 3:1, about 1:2 to 2:1, and preferably about 1:1. When the content of the fluorinated aluminate is in the predetermined content range, uniform diffusion of the component may occur, and the oxide film of the aluminum may be removed.

In addition, the flux composition for brazing aluminum may further include other additives in addition to the above-mentioned components. The additives may include a solvent, a binder, and the like, which are typically contained in the flux composition for brazing aluminum. The other additives may be contained in an amount of about 0.01 to 10 wt %, for example, about 0.1 to 5 wt %, based on the total weight of the composition. The content thereof is not limited thereto.

The solvent may suitably include water; an alcohol-based compound such as ethanol, propanol, butanol, hexanol, phenol, or a mixture thereof.

The binder may include, for example, an organic polymer, but is not limited thereto. The organic polymer may suitably include, for example, one or more selected from a butyl rubber, a polyurethane resin, a phthalate, an acrylate, a methacrylate, a vinyl resin, an epoxy resin, a nitrocellulose, a polyvinyl acetate, an isocyanate-based resin, a polyvinyl alcohol. Preferably, the binder may include an isocyanate-based resin.

As described above, the flux composition for brazing aluminum in accordance with the present invention may exhibit the bonding ability as the metal zinc produced via the above-like substitution reaction melts. Therefore, using the flux composition for brazing aluminum in accordance with the present invention, after the application of the flux composition, the aluminum base metals may be bonded by the heat treatment without the addition of a separate filler metal.

Preferably, the flux composition for brazing aluminum may be substantially free of the filler metal. As used herein, the expression "substantially free" may mean that a content of a component is less than or equal to about 5 wt %, for example, less than or equal to about 4 wt %, less than or equal to about 3 wt %, less than or equal to about 2 wt %, less than or equal to about 1 wt %, or is 0 wt % (that is, the component is not contained at all) based on a dry weight of the composition.

The flux composition for brazing aluminum may include the filler metal in an amount of about 5 wt % or less, about 4 wt % or less, about 3 wt % or less, about 2 wt % or less, about 1 wt % or less, or is 0 wt % (that is, the filler is not contained at all), based on a dry weight of the composition.

The filler metal may be a filler metal (also referred as a 'brazing filler metal') used as a component additionally incorporated after application of the conventional flux composition for brazing aluminum, for example, a filler metal in a form of a particle, a plate, or a mixture thereof. Examples of such filler metals may suitably include an Ag-based filler metal, a Cu/Brass-based filler metal, an Al-based filler metal, a CuP-based filler metal, a Ni-based filler metal, an Au-based filler metal, and a Pd-based filler metal, and the like. For example, the filler metal may include one or more selected from a group consisting of Si, Cu, Zn, Mg, Sn, Bi, Pb, Ag, Ni, and La.

Particularly, when the filler metal is selected as Zn, a separate metal Zn needs not be incorporated in addition to the zinc-based compound in the preparation of the flux composition for brazing aluminum herein. In addition, zinc metal as produced via substitution-reaction with the metal titanium during heat treating the flux may be distinguished from Zn as the filler metal.

When the flux composition for brazing aluminum contains the above-like filler metal, the bonding ability of the composition may decrease by the reaction of the filler metal with the zinc-based compound, and/or with the titanium oxide produced by the substitution reaction in the compound. Further, uniform diffusion of the components may be impeded, leading to degradation of quality and corrosion resistance.

In particular, the filler metal, which is practically not included in the flux composition, may be particulate. In addition, a particle size (D50) may be of about 10 to 200 μm, for example about 50 to 100 μm, but is not limited thereto. When the filler metal having the particle size greater than the predetermine range, for example, greater than about 200 μm, is contained, uniform diffusion capacity and bonding power of the component may be further degraded.

Preferably, the flux composition for brazing aluminum in accordance with the present invention may include: an amount of about 30 to 60 parts by weight of the zinc-based compound, for example, about 35 to 55 parts by weight, or particularly, about 40 to 50 parts by weight; an amount of about 10 to 40 parts by weight of the metal titanium, for example, about 15 to 35 parts by weight, or particularly about 20 to 30 parts by weight; and an amount of about 10 to 40 parts by weight of the fluorinated aluminate, for example, about 15 to 35 parts by weight, or about 20 to 30 parts by weight. Preferably, the fluorinated aluminate may be contained with the metal titanium in a weight ratio of about 1:4 to 4:1, for example 1:3 to 3:1, 1:2 to 2:1, and 1:1. Further, the flux composition for brazing aluminum may be substantially free of a filler metal that is one or more metals selected from the group consisting of Si, Cu, Zn, Mg, Sn, Bi, Pb, Ag, Ni, and La. More specifically, the filler metal may be contained in an amount of about 5 wt % or less, for example, about 4 wt % or less, about 3 wt % or less, about 2 wt % or less, about 1 wt % or less, and 0 wt % (that is, not contained at all), based on the total weight of the composition.

In another aspect of the present invention, provided is a method for brazing an aluminum that may include applying the composition on a subject (e.g., aluminum base material) and heat treating the composition for brazing aluminum. The heat treating may be performed at a temperature at which the substitution reaction between the zinc-based compound and the metal titanium may occur. For instance, the temperature may be greater than the melting temperature of the metal zinc, but does not damage the aluminum base metal. The temperature for the heat treating may be, for example in a suitable range of about 350 to 600° C., about 380 to 550° C., and about 390 to 500° C., but is not limited thereto.

According to various exemplary embodiments of the present invention, excellent corrosion resistance and bonding strength may be exhibited. In particular, bonding strength may be substantially improved without addition of the separate filler metal after application of the flux composition for brazing aluminum. Thus, the time required for the brazing process may be reduced, and an economic burden may be reduced substantially.

EXAMPLE

Hereinafter, embodiments will be described in detail to help understand the present invention. However, embodiments in accordance with the present invention may be modified into various other forms, and the scope of the present invention should not be construed as being limited to the following embodiments. Embodiments of the present invention are provided to more fully explain the present invention to those with average knowledge in the field to which the present invention belongs.

Experimental Example 1

Evaluation of an Effect Based on a Zinc-Based Compound Content

First, ZnO, Ti, and KAlF were dissolved in ethanol solvent in a composition shown in Table 1 below, then the flux composition for brazing aluminum was prepared by stirring with a homogenizer.

The bonding strength and the corrosion resistance were evaluated by the following method using the composition thus prepared, and the results are shown in Table 1 below.

[Bonding Strength]

Two aluminum bases (45 mm*18 mm*2 mm) are face-contacted each other such that an overlapping portion defines a size of 10 mm*5 mm. Then, the overlapping portion was brazed. Then, the bonding strength was measured. A tension test was performed at a rate of 1 mm per minute. Then, a maximum strength was measured when the bases are separated from each other.

[Corrosion Resistance]

Based on a CASS test method, CASS test solution was continuously sprayed, and a depth of a material corrosion was measured after 500 hours.

TABLE 1

| (wt %) | Production example 1 | Production example 2 | Production example 3 | Production example 4 |
| --- | --- | --- | --- | --- |
| ZnO | 25 | 35 | 45 | 55 |
| Ti | 35 | 30 | 25 | 20 |
| KAlF$_4$ | 35 | 30 | 25 | 20 |
| Binder (isocyanate based resin) | 5 | 5 | 5 | 5 |
| Total | 100 | 100 | 100 | 100 |
| Bonding strength (MPa) | 2 | 4 | 10 | 6 |
| Corrosion resistance (corrosion depth, mm) | 0.4 | 0.3 | 0.1 | 0.1 |

Experimental Example 2

Evaluation of Effect of the Metal Ti as a Substituting Metal-Comparison With the Metal Si The flux composition for brazing aluminum was prepared by replacing the metal Ti with the metal Si, then the bonding strength was measured by the above method, and the results are shown in Table 2.

TABLE 2

| | Production example 5 | Production example 6 | Production example 7 | Production example 8 | Production example 9 |
| --- | --- | --- | --- | --- | --- |
| ZnO | 45 | 45 | 45 | 45 | 45 |
| Si | 0 | 5 | 15 | 25 | 30 |
| KAlF$_4$ | 50 | 45 | 35 | 25 | 20 |

TABLE 2-continued

| | Production example 5 | Production example 6 | Production example 7 | Production example 8 | Production example 9 |
|---|---|---|---|---|---|
| Binder (isocyanate based resin) | 5 | 5 | 5 | 5 | 5 |
| Total | 100 | 100 | 100 | 100 | 100 |
| Bonding strength (MPa) | 2 | 2 | 3 | 2 | 1 |

Experimental Example 3

Evaluation of an Effect Compared With the Composition Containing the Filler Metal FIG. 1 shows a cross section of the aluminum base metal using an electron microscopy (SEM) after applying the conventional flux composition containing the zinc oxide and the titanium oxide to the aluminum base metal, then mixing the filler metal with the flux composition, and performing heat treatment at a temperature of 400° C. for 10 minutes, thereby to braze the aluminum base metal.

In addition, the bonding strength and the corrosion resistance when using the above were evaluated, and the results are shown in Table 3 below.

Figure 2:
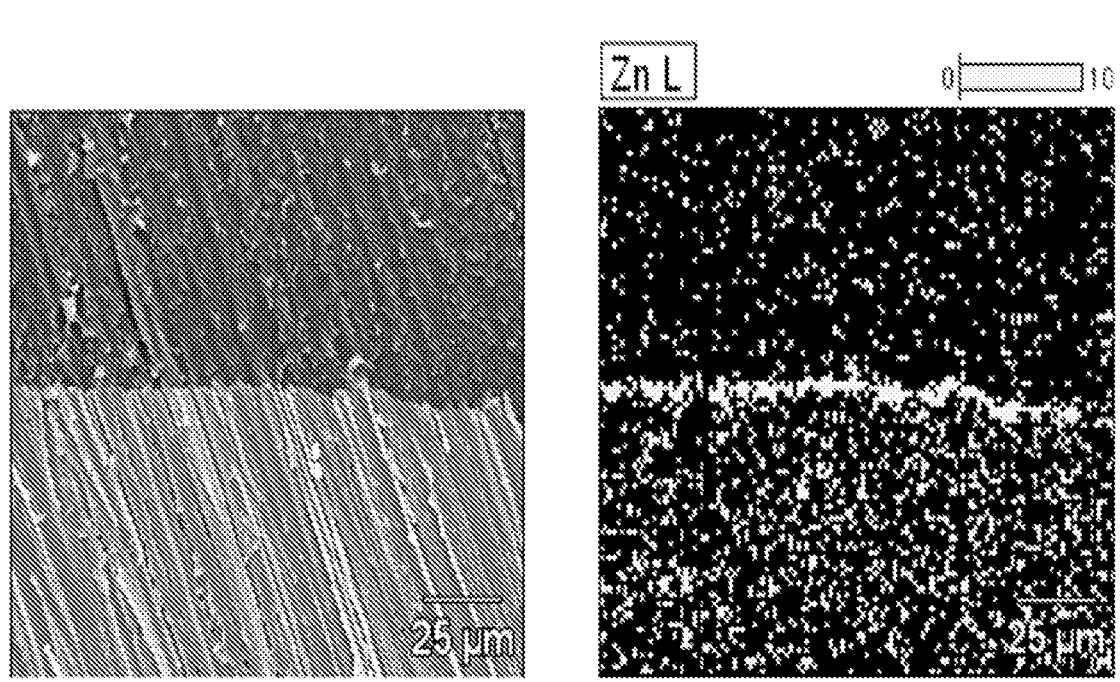
FIG. 2 shows a cross section of an exemplary aluminum base metal using an electron microscopy (SEM) after applying a flux composition containing zinc oxide and titanium to the aluminum base metal without a filler metal, and brazing the aluminum base metal by heat treating at a temperature of 400° C. for 10 minutes according to an exemplary embodiment of the present invention.

FIG. 2 shows a cross section of the aluminum base metal using the electron microscopy (SEM) after applying the flux composition containing the zinc oxide and the titanium to the aluminum base metal without addition of the filler metal, and brazing the aluminum base metal by heat treating at a temperature of 400° C. for 10 minutes.

In addition, the bonding strength and the corrosion resistance when using the above were evaluated, and the results are shown in Table 3 below.

As shown in FIG. 1, and FIG. 2, the zinc may be uniformly diffused without being interrupted by the filler metal using the flux composition in accordance with the present invention. In addition, as shown in Table 3 below, the corrosion resistance may be improved while enhancing the bonding strength using the flux composition in accordance with the present invention.

TABLE 3

| (wt %) | Production example 10 | Production example 11 |
|---|---|---|
| ZnO | 45 | 45 |
| Ti | — | 25 |
| $TiO_2$ | 25 | — |
| $KAlF_4$ | 15 | 25 |
| Filler metal (A4343) | 10 | — |
| Binder (isocyanate based resin) | 5 | 5 |
| Bonding strength (MPa) | 2 | 10 |
| Corrosion resistance (corrosion depth, mm) | 0.5 | 0.1 |

The flux composition for brazing aluminum according to various exemplary embodiments of the present invention may have substantially improved bonding strength and corrosion resistance of the base after bonding.

Further, using the flux composition for brazing aluminum according various exemplary embodiments of the present invention, base metals may be bonded to each other by applying and heat treating the flux without addition of a separate filler metal, thereby simplifying a bonding process and reducing a bonding time.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A composition for brazing aluminum, consisting of
an amount of 30 to 60 parts by weight of a zinc-based compound,
an amount of 10 to 40 parts by weight of a metal titanium (Ti), and
an amount of 10 to 40 parts by weight of a fluorinated aluminate, based on 100 parts by weight of the composition,
wherein the zinc-based compound is one or more selected from the group consisting of zinc oxide (ZnO), zinc oxide ($Zn_2O$), and zinc carbonate ($ZnCO_3$).

2. The composition of claim 1, wherein the fluorinated aluminate is represented by following Chemical Formula 1:

$K_xAl_yF_z$, wherein in the Chemical formula 1, x is in a range of 1 to 6, y is in a range of 1 to 6, z is in a range of 1 to 6, and x+y:z is in a range of 1:0.1 to 1:3.

3. The composition of claim 2, wherein the fluorinated aluminate is one or more selected from the group consisting of KAlF, $KAlF_4$, and $K_3AlF_6$.

4. A method for brazing aluminum, comprising
applying the composition of claim 1 on an aluminum base material, and
heat-treating the composition.

5. The method of claim 4, wherein the heat treating is performed at a temperature of 350 to 600° C.

6. An aluminum article comprising one or more parts, wherein a connection part between the one or more parts comprises the composition of claim 1.

7. A vehicle comprising the aluminum article of claim 6.

8. A composition for brazing aluminum, consisting of
an amount of 30 to 60 parts by weight of a zinc-based compound,
an amount of 10 to 40 parts by weight of a metal titanium (Ti), and
an amount of 10 to 40 parts by weight of a fluorinated aluminate, based on 100 parts by weight of the composition, and
an amount of 5 wt % or less of a filler metal based on 100% by weight of the dried composition for brazing aluminum,
wherein the zinc-based compound is one or more selected from the group consisting of zinc oxide (ZnO), zinc oxide ($Zn_2O$), and zinc carbonate ($ZnCO_3$).

9. The composition of claim 8, wherein a content of the filler metal is less than or equal to 2 wt % based on 100% by weight of the dried composition for brazing aluminum.

10. The composition of claim 8, wherein the filler metal is one or more selected from the group consisting of an Ag-based filler metal; Cu-based or a Brass-based filler metal; an Al-based filler metal; a CuP-based filler metal; a Ni-based filler metal; an Au-based filler metal; and a Pd-based filler metal.

11. The composition of claim 8, wherein the filler metal is one or more selected from the group consisting of Si, Cu, Mg, Sn, Bi, Pb, Ag, Ni, and La.

12. The composition of claim 8, wherein a particle size of the filler metal is in a range of 10 to 200 μm.

\* \* \* \* \*